US012782662B2

United States Patent

(12) United States Patent
Buff et al.

(10) Patent No.: US 12,782,662 B2
(45) Date of Patent: Nov. 3, 2026

(54) CABLE HARNESSES FOR USE IN AN EQUIPMENT RACK OF A FIBER OPTIC NETWORK AND METHODS FOR MANUFACTURING CABLE HARNESSES

(71) Applicant: CORNING RESEARCH & DEVELOPMENT CORPORATION, Corning, NY (US)

(72) Inventors: Scott Eaker Buff, Hickory, NC (US); Terry Lee Cooke, Hickory, NC (US); Christopher Shawn Houser, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 285 days.

(21) Appl. No.: 18/619,645

(22) Filed: Mar. 28, 2024

(65) Prior Publication Data

US 2025/0298212 A1 Sep. 25, 2025

Related U.S. Application Data

(60) Provisional application No. 63/567,018, filed on Mar. 19, 2024.

(51) Int. Cl.
*G02B 6/44* (2006.01)

(52) U.S. Cl.
CPC ................................ *G02B 6/44715* (2023.05)

(58) Field of Classification Search
None
See application file for complete search history.

(56) References Cited

U.S. PATENT DOCUMENTS

| | | |
|---|---|---|
| 4,884,862 A | 12/1989 | Kofod |
| 5,471,555 A | 11/1995 | Braga et al. |
| 5,732,181 A | 3/1998 | Engberg et al. |

(Continued)

OTHER PUBLICATIONS

International Search Report and Written Opinion of the International Searching Authority; PCT/US2025/019888; dated Jun. 10, 2025; 14 pages; European Patent Office.

(Continued)

*Primary Examiner* — Jerry Rahll
(74) *Attorney, Agent, or Firm* — Adam R. Weeks

(57) ABSTRACT

A furcation subassembly for carrying optical fibers includes a primary fanout tube configured to receive a connector. The subassembly includes a plurality of secondary fanout tubes to carry at least one optical fiber and configured to receive a connector. The furcation subassembly further includes a furcation housing having a body with opposing ends. The ends receive the primary fanout tube and the secondary fanout tubes. The body includes a first stop and a second stop. The stops define a predetermined distance between ends of the primary fanout tube and each second end of each secondary fanout tubes. A method of manufacturing a cable harness includes stripping the primary fanout tube and inserting the primary fanout tube into the furcation housing. The method includes stripping the secondary fanout tubes and bundling each of the secondary fanout tubes. The method includes inserting the plurality of secondary fanout tubes into the furcation housing.

15 Claims, 12 Drawing Sheets

(56) References Cited

U.S. PATENT DOCUMENTS

| | | | | |
|---|---|---|---|---|
| 6,278,831 | B1 | 8/2001 | Henderson et al. | |
| 6,434,315 | B1 | 8/2002 | Grois et al. | |
| 6,438,299 | B1 | 8/2002 | Brown et al. | |
| 6,771,861 | B2 | 8/2004 | Wagner et al. | |
| 6,816,663 | B2 | 11/2004 | Daoud | |
| 7,054,536 | B2 | 5/2006 | Sun | |
| 7,127,148 | B2 | 10/2006 | Mozolowski | |
| 7,461,981 | B2 | 12/2008 | Yow et al. | |
| 7,494,284 | B2 | 2/2009 | Robinson et al. | |
| 8,958,673 | B2 | 2/2015 | Cline et al. | |
| 9,417,420 | B2 | 8/2016 | Fisher et al. | |
| 9,529,173 | B2 | 12/2016 | Courchaine et al. | |
| 10,948,677 | B2 * | 3/2021 | Van Der Meulen | G02B 6/44715 |
| 2006/0088250 | A1 * | 4/2006 | Pimpinella | G02B 6/44715 385/53 |
| 2008/0138026 | A1 * | 6/2008 | Yow | G02B 6/44775 385/137 |
| 2010/0092136 | A1 * | 4/2010 | Nhep | G02B 6/4472 385/136 |
| 2015/0301300 | A1 | 10/2015 | Fisher et al. | |
| 2017/0184806 | A1 * | 6/2017 | Marius Goleret | G02B 6/44515 |
| 2019/0204524 | A1 | 7/2019 | Petersen | |
| 2023/0213722 | A1 * | 7/2023 | Blasie | G02B 6/4472 385/139 |

OTHER PUBLICATIONS

"Fan-Out and Breakout Kits", Retrieved from: https://www.fiberinstrumentsales.com/catalog-fan-out-and-breakout-kits, 2024, 21 pages.

"Wirenet", Retrieved from: https://www.wirenet-tech.com/fiber-optic-fan-out-kit/lszh-6-12-24-core-fiber-optic-cable-fan-out-kit-for-2.0mm-and-3.0mm-furcation.html, 2024, 4 pages.

* cited by examiner

U.S. Patent Nov. 3, 2026 Sheet 3 of 12 US 12,782,662 B2

CABLE HARNESSES FOR USE IN AN EQUIPMENT RACK OF A FIBER OPTIC NETWORK AND METHODS FOR MANUFACTURING CABLE HARNESSES

PRIORITY APPLICATION

This application claims the benefit of priority of U.S. Provisional Application No. 63/567,018, filed on Mar. 19, 2024, the content of which is relied upon and incorporated herein by reference in its entirety.

TECHNICAL FIELD

This disclosure relates generally to fiber optic connectivity, and more particularly to cable harnesses for connecting to equipment racks of a fiber optic network. The disclosure also relates to methods of manufacturing cable harnesses for use in an equipment rack.

BACKGROUND

The large amount of data and other information transmitted over the internet has led businesses and other organizations to develop large scale data centers for organizing, processing, storing and/or disseminating large amounts of data. Data centers contain a wide range of network equipment including, for example, servers, networking switches, routers, storage subsystems, etc. Data centers further include a large amount of cabling and equipment racks to organize and interconnect the network equipment in the data center. Modern data centers may include multi-building campuses having, for example, one primary or main building and a number of auxiliary buildings in close proximity to the main building. All the buildings on the campus are interconnected by a local fiber optic network.

Data center design and cabling-infrastructure architecture are increasingly large and complex. To manage the interconnectivity of a data center, the network equipment within the buildings on the data center campus is often arranged in structured data halls having a large number of spaced-apart rows. Each of the rows is, in turn, configured to receive a number of equipment racks or cabinets (e.g., twenty racks or cabinets) which hold the network equipment. In some data center architectures, each of the rows includes an intermediate distribution frame at a front or head end of the row (sometimes referred to as a main patch panel). Distribution cables with a relatively large number of optical fibers (high fiber counts) are routed from a building distribution frame (sometimes referred to as a main distribution frame) to the intermediate distribution frames for the different rows of equipment racks. At the intermediate distribution frames, a large number of distribution fiber optic cables with lower fiber counts are connected to the optical fibers of the associated high fiber count distribution cable(s) and routed along the row to connect to the network equipment held in the various racks in the row. To organize the large number of in-row distribution fiber optic cables, each row typically includes a cable tray or basket disposed above the row for supporting the distribution fiber optic cables as they extend along the row. The network equipment in the racks is optically connected to the distribution fiber optic cables by technicians during the construction of the data center using a large number of cables.

Some equipment rack architectures include a main rack patch panel near the top of the equipment rack and a number of equipment patch panels vertically arranged in the rack generally below the main rack patch panel. Each of the equipment patch panels holds network equipment which is to be optically connected to the distribution fiber optic cables extending along the row in the overhead cable trays. To achieve this connection, distribution fiber optic cables are routed to, for example, a rear of the main rack patch panel. The network equipment in the multiple vertically arranged equipment patch panels is then connected to the front of the main rack patch panel via separate fiber optic cables, such as cable harnesses.

As used herein, the term "patch panel" refers to any equipment panel that includes an array of connector ports to which cable assemblies can be patched, and therefore may include passive equipment patch panels and active equipment panels that are defined by one or more switches. For example, each of the equipment patch panels may have a plurality of panel openings in a particular configuration for receiving network equipment (e.g., adapters or pluggable transceiver modules). The network equipment, in turn, includes one or more connector ports for each of the panel openings in the equipment patch panel. The connector ports on the network equipment are configured to receive connectors associated with the fiber optic cables. The fiber optic cables are installed between the main rack patch panel and the equipment patch panels according to a pre-determined cable-routing architecture or scheme to ensure that information (via the optical signals transmitted through the fiber optic cables) is being routed to the proper network equipment.

With a global competitive race to enhance artificial intelligence systems, the demand for network equipment and connectivity is expected to grow exponentially. While available, current cable harness designs do not lend themselves to efficient, high-output manufacturing. This is because current designs often require extensive skilled manual labor and manufacturing is time-consuming. As such, production output of current cable harness designs is limited with current manufacturing capabilities, e.g., space and manpower. As an example, in a forward-build method, a technician assembles the cable harness by starting with an existing multifiber cable. The technician first strips a portion of a cable sheath from an already manufactured multifiber cable to expose individual optical fibers in the cable. Once the optical fibers are exposed, the technician feeds the optical fibers through a transition tube and furcates each fiber into a designated fanout leg. This is a time consuming and tedious process. As another example, in a reverse-build process, a technician starts with a plurality of existing individual fiber cables, for example, containing two optical fibers each. The technician then strips the cable sheath from each cable and feeds the stripped portion through a transition tube. The collection of the optical fibers that pass through the transition tube is then fed through a fanout tube. Once assembled according to the forward-build or reverse-build methods, connectors are crimped in place at each end to form a cable harness according to the customer's specification. In addition to the above production limitations, another drawback is the waste created. In each method, the technician strips existing cable sheath from the optical fibers. The stripped cable sheath is then disposed of as waste. In other words, an existing, useable cable is essentially repurposed and in that repurposing is partly disassembled, which is counterproductive.

Manufacturers continually strive to improve production efficiency to meet anticipated demand. Accordingly, it is believed that new cable harness designs and assembly techniques will enhance cable harness assembly efficiency while reducing related costs associated with data center construction.

SUMMARY

In one aspect of the disclosure, a furcation subassembly for carrying a plurality of optical fibers is disclosed. The furcation subassembly includes a primary fanout tube for carrying a plurality of optical fibers. The primary fanout tube has a first end and a second end. The first end is configured to receive a primary fiber optic connector. The furcation subassembly further includes a plurality of secondary fanout tubes. Each secondary fanout tube of the plurality of secondary fanout tubes has a first end and a second end. Each secondary fanout tube of the plurality of secondary fanout tubes is configured to carry at least one optical fiber of the plurality of optical fibers. The first end of each of the plurality of secondary fanout tubes is configured to receive at least one secondary fiber optic connector. The furcation subassembly further includes a furcation housing. The furcation housing has a body with a cable end opposing a breakout end. The cable end receives the second end of the primary fanout tube, and the breakout end receives the second end of each secondary fanout tube of the plurality of secondary fanout tubes. The body also includes a first stop at a first distance from the cable end and a second stop at a second distance from the breakout end. The first stop is spaced apart from the second stop by a predetermined distance that defines a fixed distance between the second end of the primary fanout tube and the second end of each secondary fanout tube of the plurality of secondary fanout tubes.

In one embodiment, the body may include a transition portion between the first stop and the second stop. The transition portion decreases in cross-sectional area from the second stop toward the first stop. For example, the transition portion may have a funnel configuration. In this way, when the plurality of optical fibers is inserted through the furcation housing, the transition portion is configured to guide each optical fiber of the plurality of optical fibers from each secondary fanout tube of the plurality of secondary fanout tubes into the primary fanout tube during, for example, an assembly process.

In one embodiment, the body may include a first opening at the cable end and a second opening at the breakout end. The first opening is configured to receive the primary fanout tube and the second opening is configured to receive the plurality of secondary fanout tubes. In an exemplary embodiment, the second opening may have a cross-sectional area greater than a cross-sectional area of the first opening. In one embodiment, the body may include at least one opening for receiving an epoxy for fixating the optical fibers in the furcation housing. The fixation of the optical fibers in the furcation housing using the epoxy generally isolates the optical fibers from tension forces on the cable harness and transfers tension forces to the fanout tubing instead of to the optical fibers themselves.

In one embodiment, each of the secondary fanout tubes of the plurality of secondary fanout tubes may be equal in length from a respective first end to a respective second end. In another embodiment, however, a first length from a respective first end to a respective second end of each secondary fanout tube of a first group of at least two secondary fanout tubes of the plurality of the secondary fanout tubes may be equal, and a second length from a respective first end to a respective second end of each secondary fanout tube of a second group of at least two secondary fanout tubes of the plurality of secondary fanout tubes may be equal. In this embodiment, the first length may not be equal to the second length to thereby provide a staggered configuration to groups of the secondary fanout tubes and secondary fiber optic connectors.

In one embodiment, neither of the primary fanout tube nor the plurality of secondary tubes houses an optical fiber. In this embodiment, for example, a plurality of furcation assemblies may be pre-made and stored in inventory. When a specific order is received for cable harnesses, the optical fibers may be inserted through the primary and secondary fanout tubes, and the optical fibers terminated at both ends to complete the cable harness. By providing pre-made furcation assemblies, lead times for complete cable harnesses may be significantly reduced.

In another aspect of the disclosure, a rack cable harness is disclosed. The rack cable harness includes an embodiment of the furcation subassembly according to the first aspect disclosed above and a plurality of optical fibers that extend from the first end of the primary fanout tube, through the furcation housing, and through corresponding secondary fanout tubes of the plurality of secondary fanout tubes to the first end of each secondary fanout tube. In one embodiment, the rack cable harness may further include at least one primary fiber optic connector terminating the plurality of optical fibers at the first end of the primary fanout tube and configured to be connected to a fiber optic network. Additionally, the rack cable harness may further include a plurality of secondary fiber optic connectors, where the first end of each of the secondary fanout tubes of the plurality of secondary fanout tubes is terminated by at least one secondary fiber optic connector of the plurality of secondary fiber optic connectors.

In another aspect of the disclosure, a furcation housing for use in a cable harness carrying a plurality of optical fibers through a primary fanout tube and through a plurality of secondary fanout tubes is disclosed. The furcation housing includes a body having a cable end opposing a breakout end. The cable end is configured to receive an end of the primary fanout tube, and the breakout end is configured to receive an end of each of the secondary fanout tubes of the plurality of secondary fanout tubes. The body includes a first stop at a first distance from the cable end and a second stop at a second distance from the breakout end. The first stop is spaced apart from the second stop by a predetermined distance that is configured to define a fixed distance between the end of the primary fanout tube and each end of each of the secondary fanout tubes of the plurality of secondary fanout tubes when the primary fanout tube and the plurality of secondary fanout tubes are inserted into the furcation housing.

In one embodiment, the body may include a transition portion between the first stop and the second stop. The transition portion has an inner surface that defines a cross-sectional area. The cross-sectional area decreases from the second stop toward the first stop. For example, in one embodiment, the transition portion may have a funnel configuration. The funnel configuration operates as a guide during assembly of the optical fibers in the primary and secondary fanout tubes of the furcation assemblies, for example.

In one embodiment, the body may include a first opening at the cable end and a second opening at the breakout end. The first opening is configured to receive the primary fanout tube and the second opening is configured to receive the plurality of secondary fanout tubes. In this embodiment, the second opening may have a cross-sectional area greater than a cross-sectional area of the first opening. Additionally, the body may include at least one opening for receiving an adhesive, such as epoxy, to fix the optical fibers extending through the furcation housing.

In another aspect of the disclosure, a method of manufacturing a rack cable harness for carrying a plurality of optical fibers is disclosed. The cable harness includes (i) a primary fanout tube for carrying a plurality of optical fibers, (ii) a plurality of secondary fanout tubes, each of the secondary fanout tubes of the plurality of secondary fanout tubes for carrying at least one optical fiber of the plurality of optical fibers, and (iii) a furcation housing including a body having a cable end opposing a breakout end. The body defines a first stop at a first distance from the cable end and a second stop at a second distance from the breakout end. The first stop is spaced apart from the second stop by a predetermined distance. The method includes stripping an end portion of the primary fanout tube to expose an inner layer of the primary fanout tube. The stripped end forms a first end of the primary fanout tube. The method further includes inserting the first end of the primary fanout tube into the cable end of the furcation housing. The first end of the primary fanout tube may be inserted into the cable end until the first end abuts the first stop. The method further includes stripping an end portion of each of the secondary fanout tubes of the plurality of secondary fanout tubes to expose an inner layer of each secondary fanout tube of the plurality of secondary fanout tubes. The stripped end forms a first end for each of the secondary fanout tubes of the plurality of secondary fanout tubes. The method further includes bundling each of the secondary fanout tubes of the plurality of secondary fanout tubes to form an assembly of the plurality of secondary fanout tubes. The method further includes inserting the assembly of the plurality of secondary fanout tubes into the breakout end of the furcation housing. The assembly of the plurality of secondary fanout tubes may be inserted into the break out end until one or more of the secondary fanout tubes abuts the second stop. The first end of the primary fanout tube is a fixed distance from the first end of each of the secondary fanout tubes in the assembly of the plurality of secondary fanout tubes. The fixed distance is determined by the predetermined distance between the first stop and the second stop.

In one embodiment, following inserting the first end of the primary fanout tube, the method may further include cutting the primary fanout tube to form a second end of the primary fanout tube. The first end to the second end of the primary fanout tube may be of a first predetermined length and the second end of the primary fanout tube may be configured to receive a primary fiber optic connector. Moreover, following inserting the assembly of the plurality of secondary fanout tubes into the breakout end of the furcation housing, the method may further include cutting at least one of the secondary fanout tubes of the plurality of secondary fanout tubes to form a second end of the at least one of the secondary fanout tubes. The first end to the second end of the at least one of the secondary fanout tubes may be of a second predetermined length, and the second end of the at least one of the secondary fanout tubes may be configured to receive a secondary fiber optic connector.

In one embodiment, cutting the at least one of the secondary fanout tubes includes cutting each of the secondary fanout tubes of the plurality of fanout tubes to the second predetermined length. In an alternative embodiment, cutting the at least one of the secondary fanout tubes includes cutting each tube of a first group of at least two secondary fanout tubes of the plurality of fanout tubes to a first length and cutting each tube of a second group of at least two secondary fanout tubes of the plurality of fanout tubes to a second length. In this embodiment, the first length may be different from the second length to provide a staggered configuration for the plurality of second fanout tubes.

In one embodiment, the method may further include inserting at least one optical fiber through one of the secondary fanout tubes of the plurality of fanout tubes, through the body, and into the primary fanout tube. For example, in one embodiment, inserting may include jetting, blowing, or vacuuming the at least one optical fiber through one of the secondary fanout tubes. In an exemplary embodiment, each of the plurality of optical fibers may be inserted through the secondary fanout tubes, such as by jetting, blowing, vacuuming, or other suitable insertion technique.

In one embodiment, the body may include an opening between the cable end and the breakout end, and the method may further include injecting an adhesive through the opening and into contact with the at least one optical fiber in the furcation housing. The adhesive is configured to fix the at least one optical fiber in the furcation housing to isolate the at least one optical fiber from tension forces imposed on the rack cable harness.

In one embodiment, bundling each of the secondary fanout tubes of the plurality of secondary fanout tubes may further include wrapping heat shrink around an outer diameter of the assembly at or adjacent the furcation end, and heating the heat shrink to bind each of the secondary fanout tubes of the plurality secondary fanout tubes in the assembly. In one embodiment, bundling each of the secondary fanout tubes of the plurality of secondary fanout tubes may further include wrapping heat shrink around an outer diameter of the assembly at a location spaced apart from the first end of each of the secondary fanout tubes of the plurality of fanout tubes, and heating the heat shrink to bind each of the secondary fanout tubes of the plurality secondary fanout tubes in the assembly.

In one embodiment, the method may further include securing a portion of a primary fiber optic connector to the primary fanout tube. Additionally, or alternatively, the method may include securing a portion of one or more secondary fiber optic connectors to one or more of the secondary fanout tubes.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to cable harnesses for use in an equipment rack of a fiber optic network and methods of manufacturing a cable harness. Each cable harness is configured to connect a main rack patch panel near a top of the equipment rack to a plurality of equipment patch panels in the equipment rack. In one embodiment, the cable harness is manufactured from a furcation subassembly, which is assembled without optical fibers and placed in the inventory in advance of receiving orders for cable harnesses. Once an order for a specific cable harness is received, a furcation subassembly may be removed from inventory and cut to a specified length, if necessary. The specific cable harness is assembled by installing a plurality of optical fibers into the cut-to-length furcation subassembly. The optical fibers are then terminated at each end of the cable harness with a customer-specified fiber optic connector. In an alternative embodiment, a portion of a fiber optic connector may form part of the subassembly with the remainder of the fiber optic connector being added following addition of the optical fibers. Alternatively, optical fibers may be inserted into the furcation subassembly and then placed into inventory. Once an order for a cable harness is received, the furcation subassembly and installed optical fibers may be cut to length and then terminated with the customer-specified fiber optic connectors. According to embodiments, existing fiber optic cables are not modified in the manufacture of cable harnesses according to the disclosure. Advantageously, the inventoried furcation subassemblies significantly reduce manufacturing lead time and reduce material waste during the manufacturing of the cable harnesses.

Furthermore, the furcation subassembly advantageously facilitates installation of the optical fibers after the furcation subassembly is manufactured. Thus, neither the forward-build nor reverse-build processes is utilized. To facilitate manufacturing of the cable harness, the furcation subassembly includes a furcation housing configured to guide the optical fibers during their installation through an already-manufactured furcation subassembly. In particular, the furcation housing guides each optical fiber as it is inserted from one of a plurality of secondary fanout tubes to a primary, multifiber fanout tube capable of containing all optical fibers necessary to meet the customer's specification. The furcation housing essentially funnels each optical fiber from one secondary fanout tube into the primary fanout tube.

Figure 1:
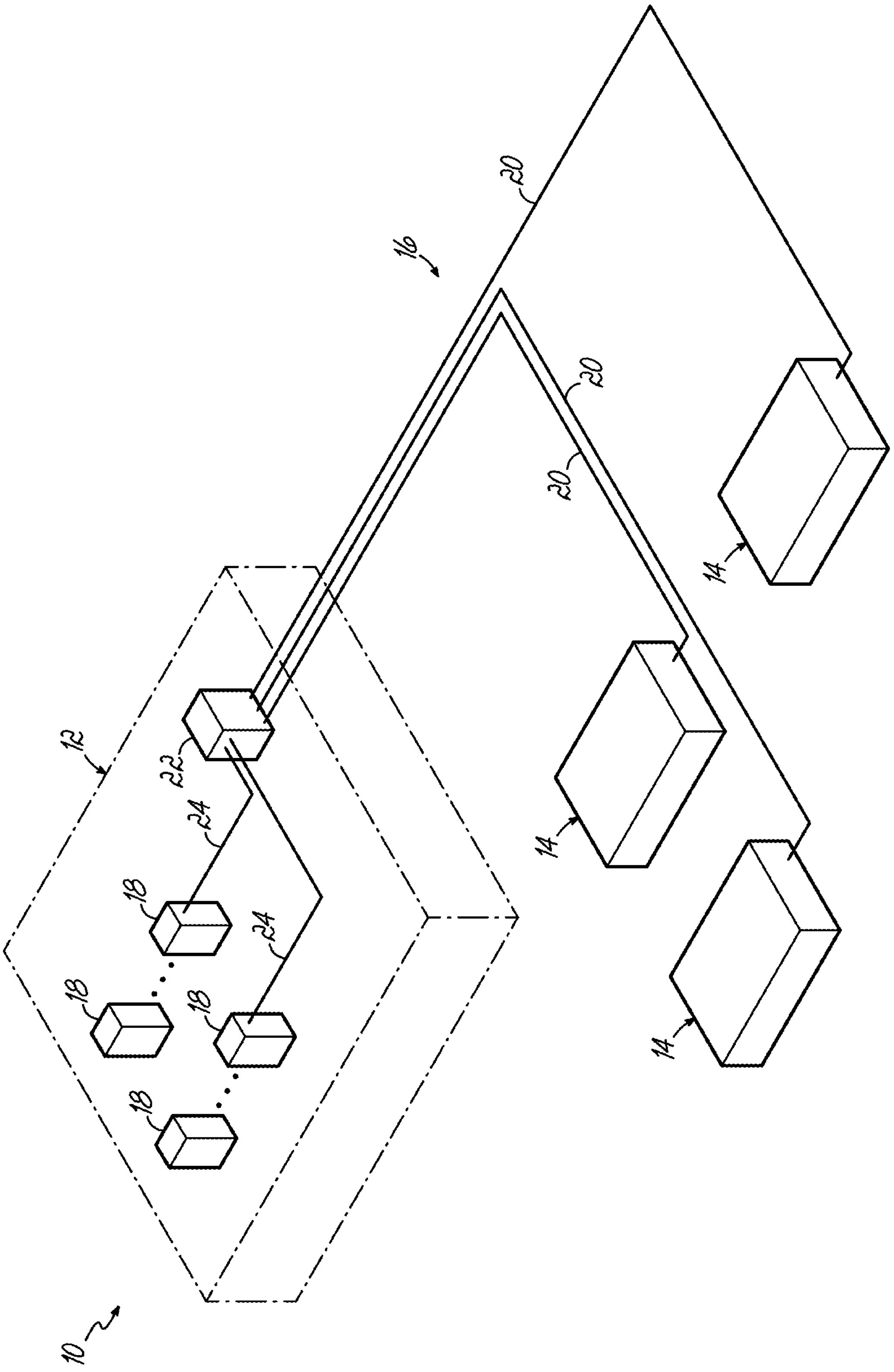
FIG. 1 is a schematic illustration of a data center campus.

Now referring to FIG. 1, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows network equipment 18 in the main building 12 to communicate with various network equipment (not shown) in the auxiliary buildings 14. In the old exemplary embodiment shown, the local fiber optic network 16 includes trunk cables 20 extending between the main building 12 and each of the auxiliary buildings 14. Conventional trunk cables 20 generally include a high fiber-count arrangement of optical fibers for passing data and other information through the local fiber optic network 16. In the example illustrated in FIG. 1, the trunk cables 20 from the auxiliary buildings 14 are routed to one or more distribution cabinets 22 housed in the main building 12 (one shown).

Within the main building 12, a plurality of indoor fiber optic cables 24 ("indoor cables 24") are routed between the network equipment 18 and the one or more distribution cabinets 22. The indoor cables 24 generally include a high fiber-count arrangement of optical fibers for passing data and other information from the distribution cabinets 22 to the network equipment 18. Although only the interior of the main building 12 is schematically shown in FIG. 1 and discussed above, each of the auxiliary buildings 14 may house similar equipment for similar purposes. Thus, although not shown, each of the trunk cables 20 may be routed to one or more distribution cabinets 22 in one of the auxiliary buildings 14 in a manner similar to that described above. Furthermore, each of the auxiliary buildings 14 may include indoor cables 24 that extend between network equipment 18 and the one or more distribution cabinets 22 of the auxiliary building 14.

Figure 2:
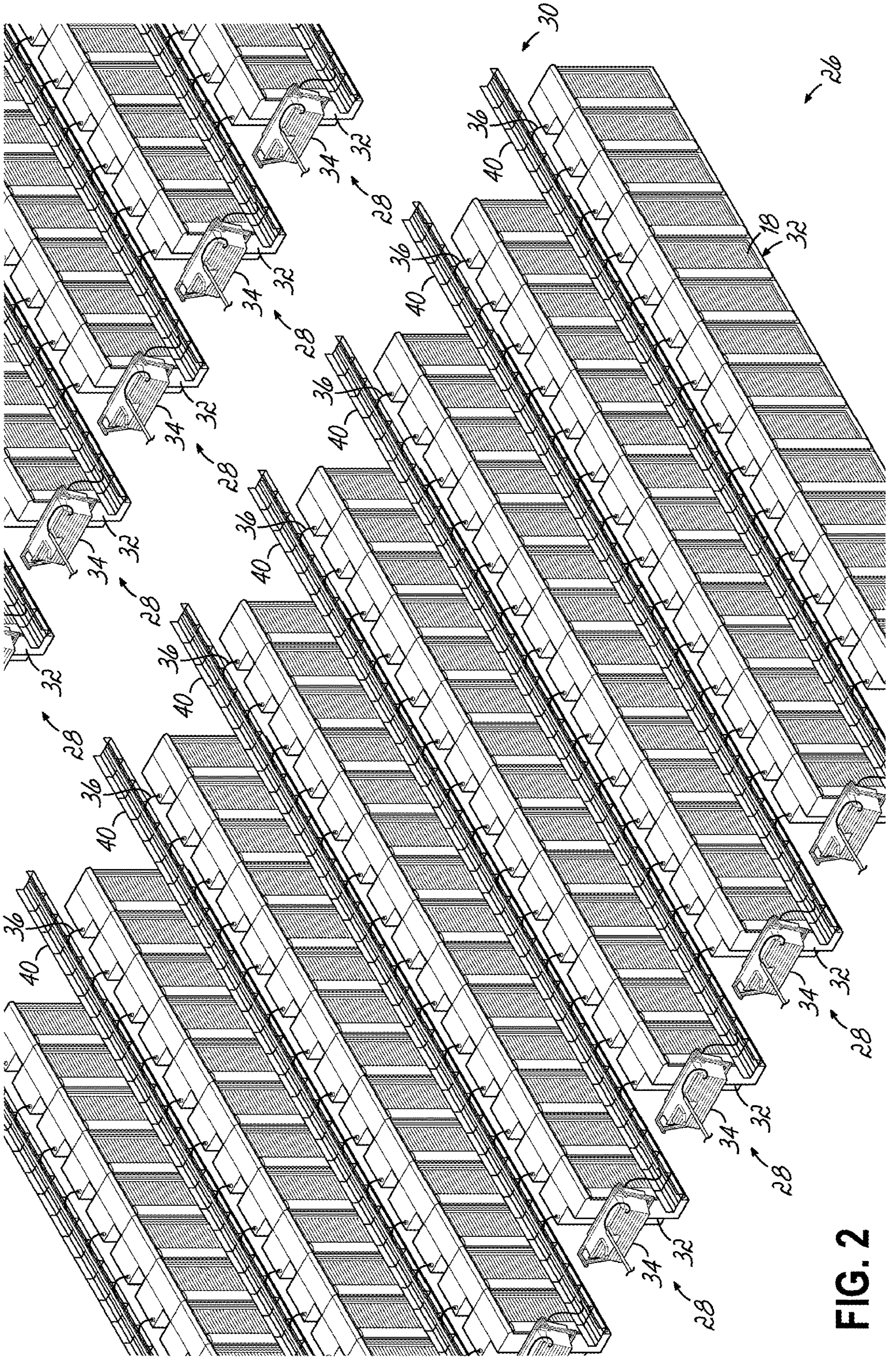
FIGS. 2 and 3 are partial perspective views of an exemplary data hall of the data center shown in FIG. 1.
Figure 3:
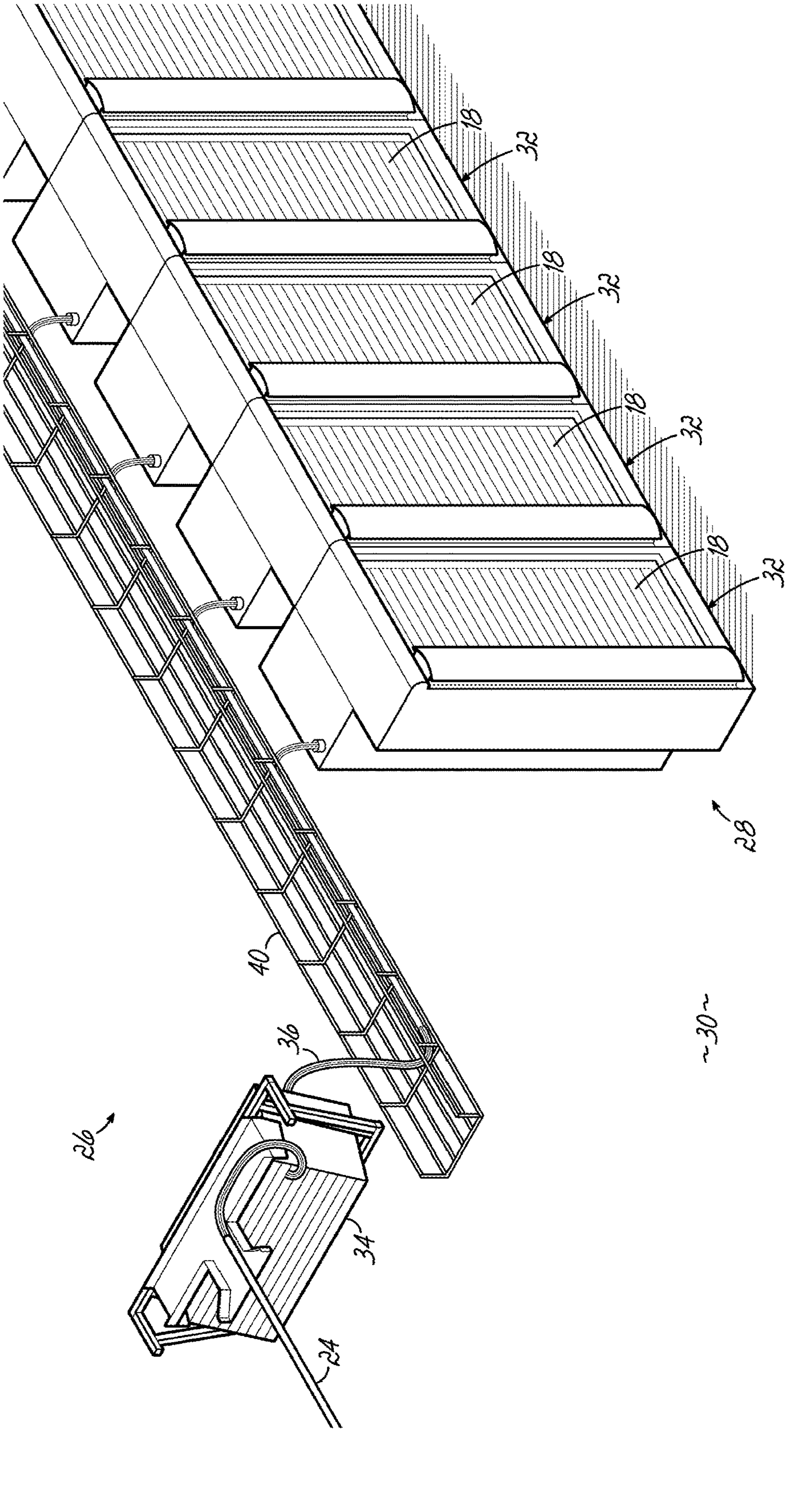

As illustrated in more detail in FIGS. 2 and 3, the network equipment 18 in the main building 12 or an auxiliary building 14 may be arranged in one or more data halls 26 that generally include a plurality of spaced-apart rows 28 on one or both sides of an access pathway 30. The arrangement of the data halls 26 into rows 28 helps organize the large number of equipment, fiber optic cables, fiber optic connections, etc. Each of the rows 28 includes a plurality of equipment racks or cabinets 32 (referred to hereafter as "equipment racks 32" or "racks 32") generally arranged one next to the other along the row 28. Each of the equipment racks 32 is a vertically arranged framework for holding various network equipment 18 of the data center 10, as is generally known in the telecommunications industry.

In one common arrangement, and as further illustrated in FIGS. 2 and 3, each row 28 may include an intermediate distribution frame 34 at the head end of the row 28 closest to the access pathway 30. The intermediate distribution frame 34 represents a termination point of at least some of the optical fibers carried by one or more of the indoor cables 24, for example. Although the intermediate distribution frame 34 is shown as being positioned above the row 28, in other embodiments, the intermediate distribution frame 34 may be in a cabinet (not shown) at the head end of the row 28 or in the first equipment rack 32 at the head end of the row 28. In yet other embodiments, the intermediate distribution frame 34 may be located within the associated row, such as in the middle of the row, and be above, below, or within one of the equipment racks 32. In a conventional arrangement, one or more distribution cables 36 (only a representative one is shown in FIGS. 2 and 3) are connected to the intermediate distribution frame 34 of a row 28 and routed along a cable tray 40 generally disposed above the row 28. The network equipment 18 in the equipment racks 32 is then optically connected to the one or more distribution cables 36 to provide the interconnectivity of the network equipment 18 of the data center 10.

Figure 4:
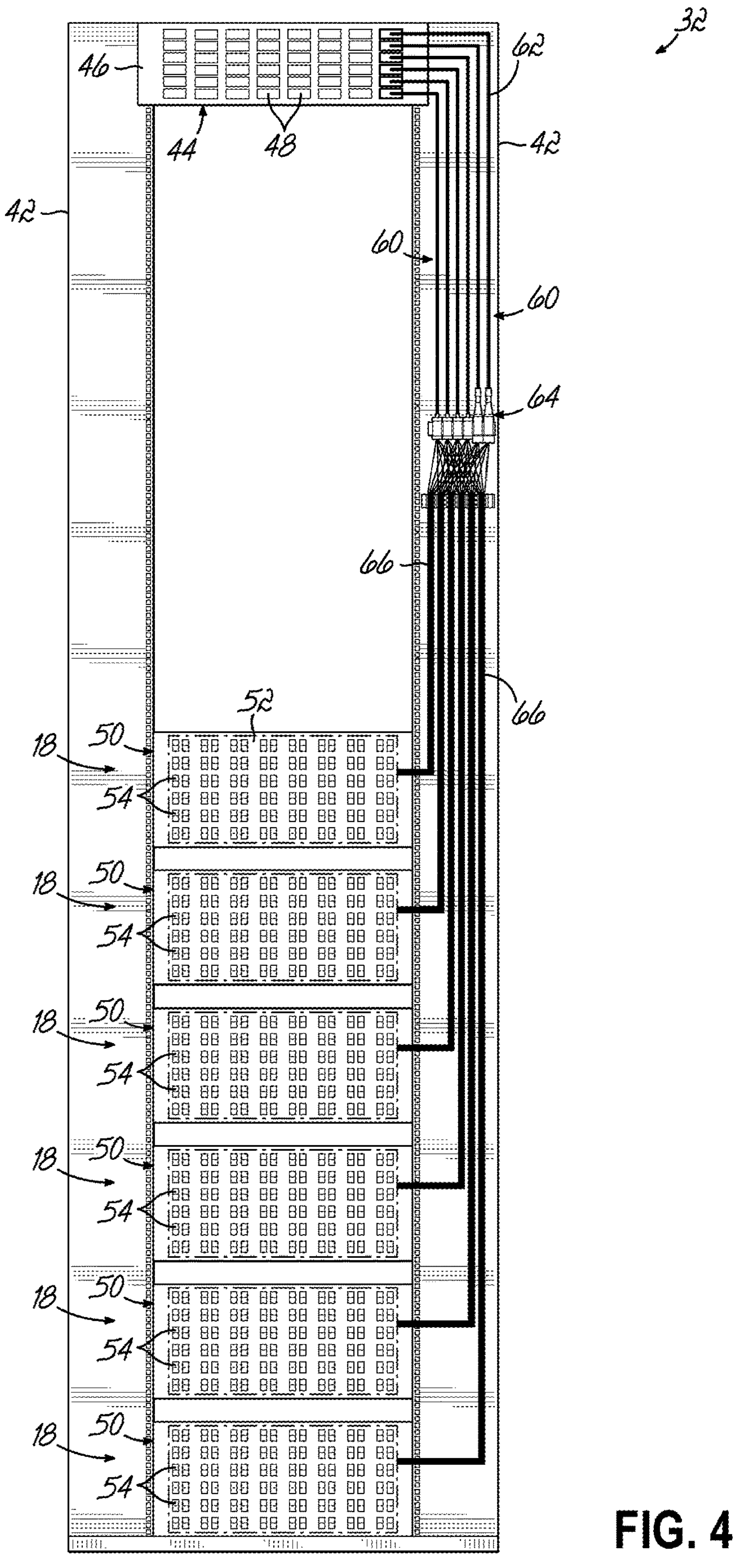
FIG. 4 is an equipment rack, such as those shown in FIG. 3, having cable harnesses installed therein.

With reference now to FIG. 4, one example of an equipment rack 32 is shown. The equipment rack 32 has a generally known construction and includes a plurality of vertical rails 42 that provide a framework for the equipment rack 32. In the exemplary embodiment shown, the equipment rack 32 includes a main rack patch panel 44 near a top of the equipment rack 32 that is configured to be connected to the one or more distribution cables 36 extending along the row 28 in the overhead cable trays 40 (FIG. 3). More particularly, the main rack patch panel 44 may include a rear interface (not shown) defining a plurality of connector interfaces or rear connector ports for making connections with the one or more distribution cables 36. The main rack patch panel 44 further includes a front interface 46 defining a plurality of front connector ports 48. Additionally, the equipment rack 32 typically includes a plurality of equipment patch panels 50 secured to the vertical rails 42 of the equipment rack 32. The equipment patch panels 50 may be the front panels of switches or other network equipment 18, or may be passive equipment patch panels. In one embodiment, for example, the equipment rack 32 may include six equipment patch panels 50; however, the number may vary depending on the rack architecture. In one embodiment, the equipment patch panels 50 may be arranged below the main rack patch panel 44 in the equipment rack 32, but other arrangements may also be possible.

With continued reference to FIG. 4, each of the equipment patch panels 50 has a front interface 52 including a plurality of connector ports 54. Each of the connector ports 54 may be defined by adapters or optical interfaces (e.g., if the equipment patch panel 50 is defined by a network switch that includes optical interfaces). In the exemplary embodiment, the plurality of connector ports 54 in the equipment patch panel 50 has a particular pattern or arrangement on the front interface 52 of the equipment patch panel 50. By way of example, and without limitation, the plurality of connector ports 54 may be configured as a generally rectangular array having a plurality of rows and columns in the array. In one embodiment, for example, each equipment patch panel 50 may include an array of connector ports 54 with 6 rows and 16 columns, as illustrated in the figures (for a total of ninety-six connector ports 54). However, the number of rows and the number of columns in the array may be different from that above and selected for a particular application. It should be further understood that the pattern of connector ports 54 on the equipment patch panels 50 may have configurations other than an array.

Each of connector ports 54 of the equipment patch panels 50 is configured to be connected to one of the front connector ports 48 of the main rack patch panel 44. For that purpose, a plurality of rack cable harnesses 60 extend between the equipment patch panels 50 and the main rack patch panel 44. Each rack cable harness 60 connects one or more of the equipment patch panels 50 to the main rack patch panel 44. Aspects of the disclosure are directed to at least one of the rack cable harnesses 60. More particularly, aspects of the disclosure are directed to a rack cable harness 60 configured to optically connect two patch panels. Connecting one or more of the equipment patch panels 50 to the main rack patch panel 44 in the equipment rack 32 is merely one example use of a rack cable harness 60. In alternative embodiments, an equipment rack 32 may include different types and arrangements of patch panels than what is shown in FIG. 4, but still require rack cable harnesses 60 to connect two or more of the patch panels. Furthermore, aspects of the disclosure are also directed to a furcation subassembly and a furcation housing, each of which is described below in conjunction with manufacturing the rack cable harness 60.

Figure 5:
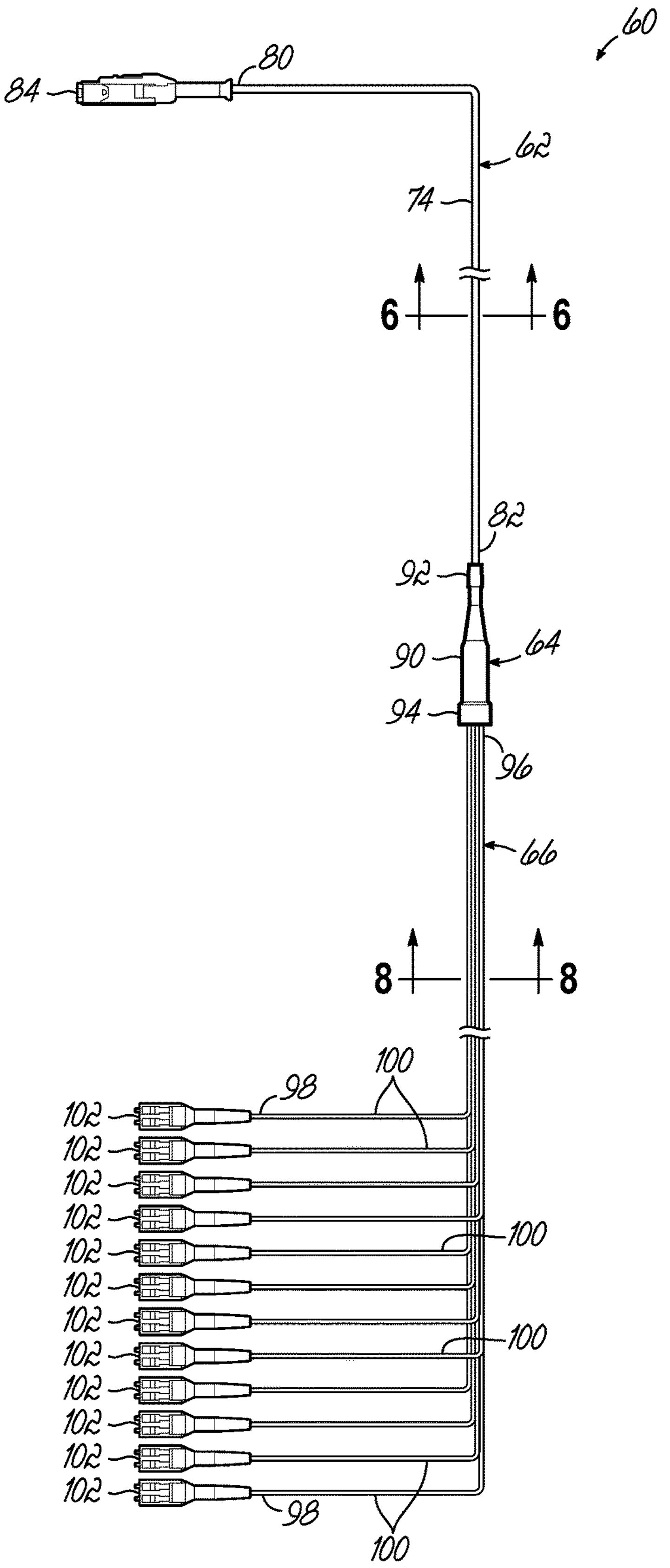
FIG. 5 is an exemplary cable harness configured to be mounted in the equipment rack of FIG. 4 according to an embodiment of the disclosure.

With reference to FIGS. 4 and 5, one exemplary rack cable harness 60 is shown. The rack cable harness 60 includes a multifiber cable 62, a furcation housing 64, and a plurality of breakout legs 66 (shown as a single heavyweight line in FIG. 4 and as a plurality of individual lines in FIG. 5). The rack cable harness 60 carries a plurality of optical fibers for passing data and other information through the local fiber optic network 16, and more specifically between the main rack patch panel 44 and one or more of the patch panels 50 in an equipment rack 32 of the row 28 (see, e.g., FIG. 3). The number of optical fibers carried by the rack cable harness 60 (i.e., through the multifiber cable 62, the furcation housing 64, and the plurality of breakout legs 66) may vary based on the application.

The multifiber cable 62 of the rack cable harness 60 includes a network end 80 and a furcation end 82 opposite the network end 80. The network end 80 of the multifiber cable 62 includes at least one primary fiber optic connector 84 terminating the optical fibers in the multifiber cable 62 at the network end 80. The primary fiber optic connector 84 is configured to be connected to a connector port 48 associated with the main rack patch panel 44 in the equipment rack 32 (which is, in turn, connected to the one or more distribution cables 36 extending along the row 28 in the cable tray 40, each shown in FIG. 3). Any conventional, or yet to be developed, optical connector or connectorization scheme may be used in accordance with the present disclosure, including, but not limited to simplex or duplex connectors (e.g., LC connectors) and multi-fiber connectors (e.g., MPO connectors). For example, the primary fiber optic connector 84 may be an MPO (multi-fiber push on) connector, which is configured for multi-fiber cables including multiple subunits of optical fibers (e.g., between four to 24 optical fibers). In other embodiments, the primary fiber optic connector 84 may be a different type of multi-fiber connector, such as an SN-MT connector commercially available from Senko Advanced Components, Inc. or an MMC connector commercially available from US Conec Ltd. In the exemplary embodiment shown in FIG. 5, the optical fibers of the multifiber cable 62 are terminated by a 24-fiber MMC connector.

Figure 6:
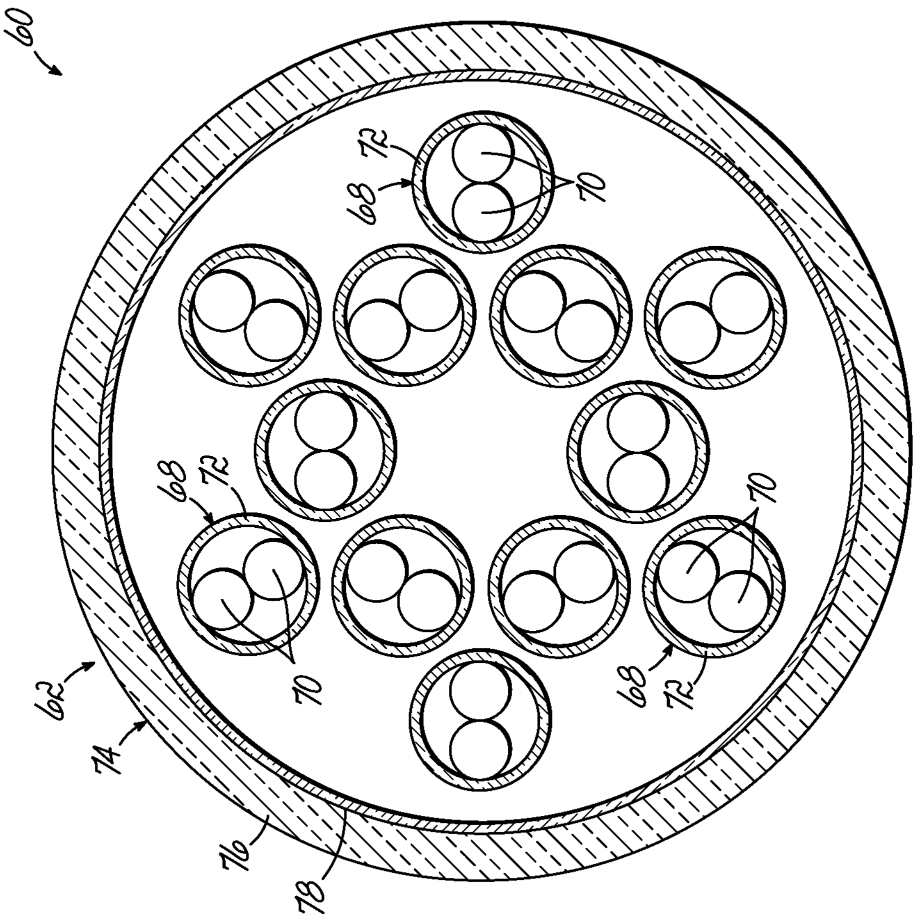
FIG. 6 is a cross-sectional view of the cable harness taken along section line 6-6 shown in FIG. 5.

As shown in FIG. 6, the multifiber cable 62 contains a plurality of subunits 68. Each subunit 68 carries a preselected number of optical fibers 70. By way of example and without limitation, in an exemplary embodiment, each subunit 68 may be configured to carry two optical fibers 70 within a subunit outer jacket 72. It should be recognized, however, that in alternative embodiments, more or fewer optical fibers 70 may be carried by each of the subunits 68 and the multifiber cable 62.

In the embodiment shown, the multifiber cable 62 includes a primary fanout tube 74 that carries the subunits 68 or alternatively, carries the optical fibers 70 in a loose configuration without subunit outer jackets 72. Although the multifiber cable 62 is shown as including twelve subunits 68, the number of subunits 68 may be more or less than this number in alternative embodiments. The plurality of subunits 68 may be arranged within the primary fanout tube 74, which may be constructed of a plurality of layers. As an example, the primary fanout tube 74 may include an outer protective sheath layer 76 and an inner buffer layer 78. Each of the subunits 68 contains two optical fibers 70. Thus, in one embodiment, the multifiber cable 62 may carry twenty-four optical fibers 70.

Figure 7:
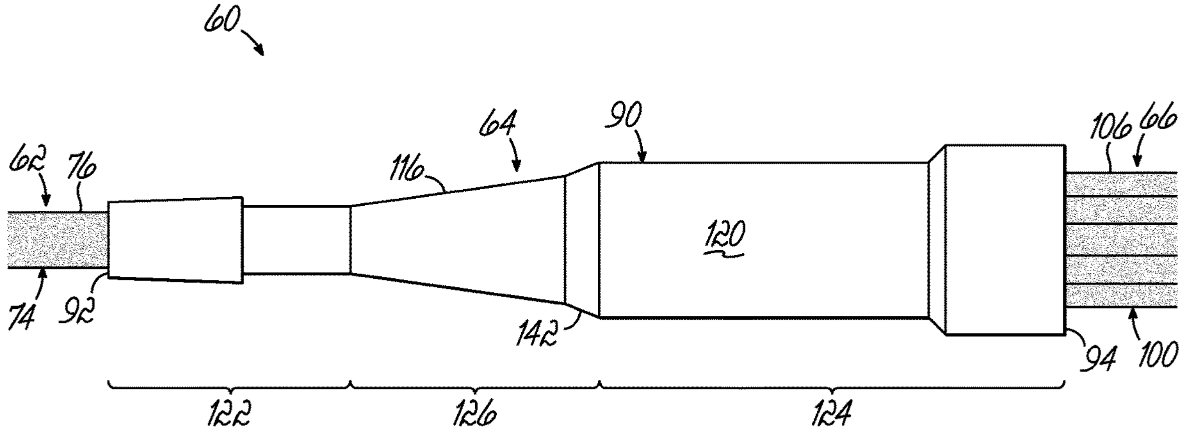
FIG. 7 is a plan view of a furcation housing shown in FIG. 5 in accordance with an embodiment of the disclosure.
Figure 7A:
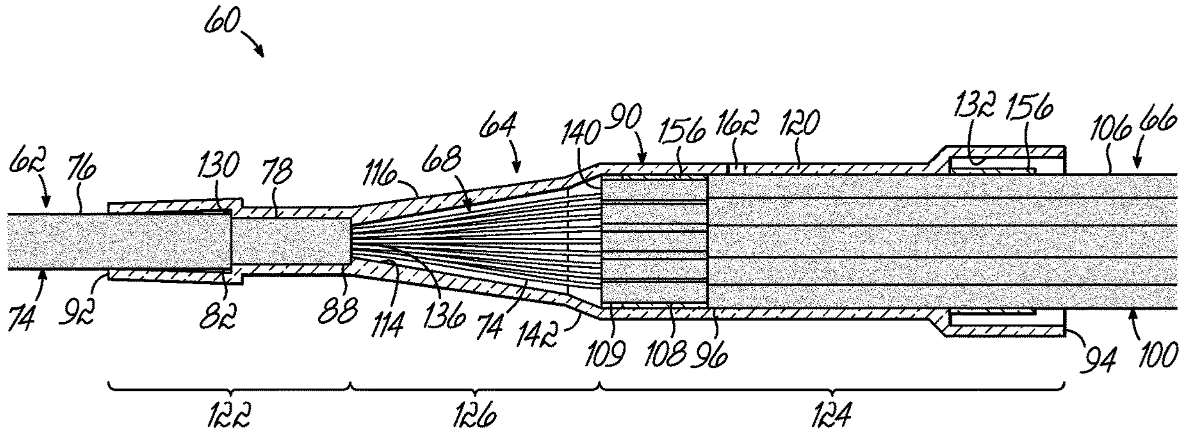
FIG. 7A is a cross-sectional view of the furcation housing shown in FIG. 7.

With reference to FIGS. 5, 7, and 7A, in one embodiment, the primary fanout tube 74 may extend into the furcation housing 64. The furcation housing 64 includes a body 90 that, in the exemplary embodiment, has a generally tubular configuration. The body 90 has a cable end 92 opposing a breakout end 94. The cable end 92 receives the primary fanout tube 74. As shown in FIG. 7A, the primary fanout tube 74 of the multifiber cable 62 may define a furcation end 82 at a location within the body 90, although the inner buffer layer 78 (when present) may extend beyond the outer protective sheath layer 76 of the primary fanout tube 74 and so end at a location 88 spaced apart from the end of the outer protective sheath layer 76 in the body 90.

With reference to FIG. 7A, within the body 90 of the furcation housing 64, the subunits 68 are furcated into the plurality of breakout legs 66. As noted above, although the multifiber cable 62 is shown as including twelve subunits 68 such that there are twelve breakout legs 66, a ratio of subunits 68 to breakout legs 66 need not be one-to-one. Within the furcation housing 64, the subunit outer jackets 72 or the optical fibers 70 are not contained within an outer jacket or tube. Although not shown in FIG. 7A, at a location in the furcation housing 64 in which the subunits 68 or the optical fibers 70 are not contained within an outer jacket, they may be at least partly encased in an epoxy that is injected into the furcation housing 64.

Figure 8:
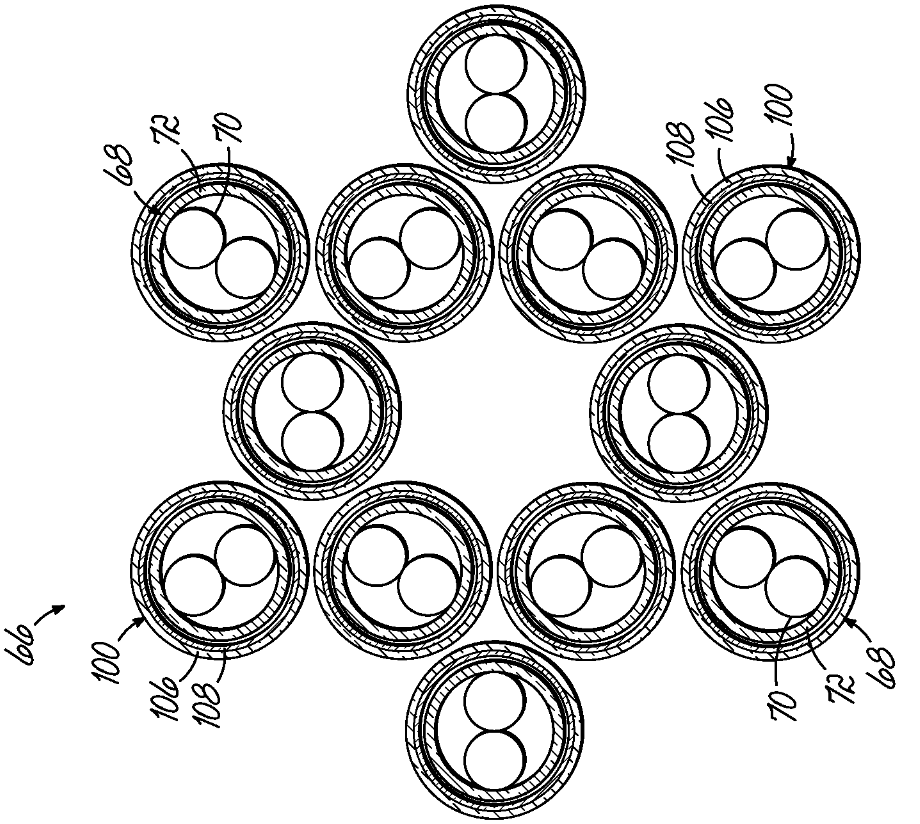
FIG. 8 is a cross-sectional view of the cable harness taken along section line 8-8 shown in FIG. 5.

Returning to FIG. 5, in one embodiment, each of the plurality of breakout legs 66 includes a furcation end 96 received in the breakout end 94 of the furcation housing 64 and a rack end 98 opposite the furcation end 96. While in some embodiments, the subunit outer jackets 72 may function as outer jackets for a corresponding breakout leg 66, in other embodiments and as shown in FIG. 8, a secondary fanout tube 100 may contain the subunits 68 or the optical fibers 70 (which may be in a loose configuration rather than part of subunits 68) and protects the subunits 68/optical fibers 70 between the furcation housing 64 and the rack end 96. To that end, the secondary fanout tubes 100 may include a plurality of layers. In the exemplary embodiment, the secondary fanout tube 100 includes an outer jacket 106 and a buffer layer 108. The secondary fanout tubes 100 may each define the furcation end 96 for a respective breakout leg 66 at a location within the tubular body 90 of the furcation housing 64 (as shown in FIG. 7A).

With continued reference to FIG. 5, in the exemplary embodiment, the rack end 98 of each of the plurality of breakout legs 66 includes at least one secondary fiber optic connector 102 terminating the optical fibers 70 in each of the breakout legs 66. Further in that regard, as is generally shown in FIG. 4, each secondary fiber optic connector 102 is configured to be connected to a connector port 54 associated with the network equipment 18 in the equipment patch panels 50 in the equipment rack 32. Similar to the primary fiber optic connector 84, described above, any conventional, or yet to be developed, optical connector or connectorization scheme may be used in accordance with the present disclosure, including, but not limited to simplex or duplex connectors (e.g., LC connectors) and multi-fiber connectors (e.g., MPO, MMC, or SN-MT connectors). For example, each of the breakout legs 66 may be terminated by a secondary fiber optic connector 102 configured as a duplex LC connector to correspond to the two optical fibers in each of the breakout legs 66 extending from the furcation housing 64. In other embodiments, the secondary fiber optic connectors 102 may be a different type of duplex connector, such as an SN connector commercially available from Senko Advanced Components, Inc. or an MDC connector commercially available from US Conec Ltd.

Figure 7B:
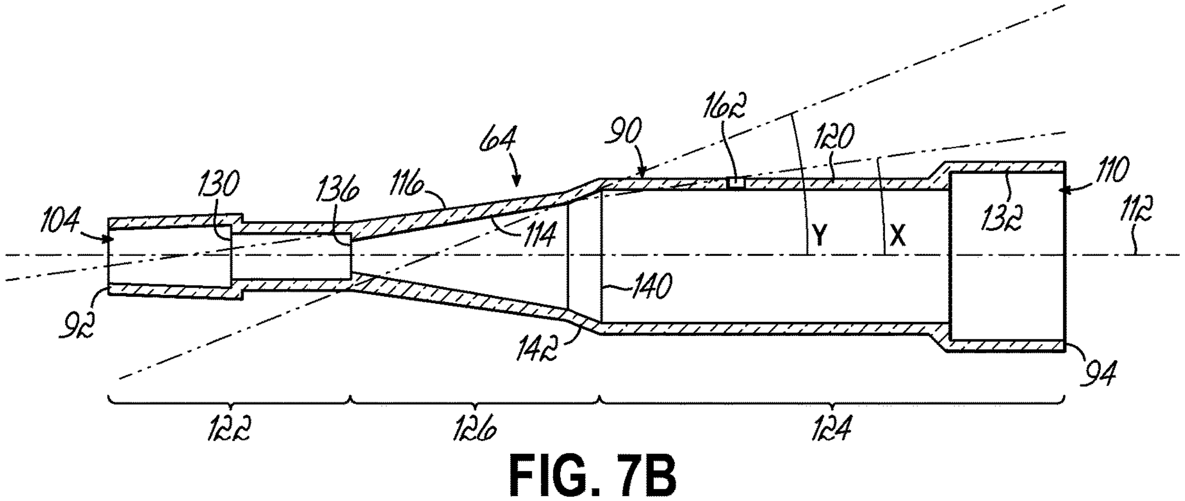
FIG. 7B is a cross-sectional view of the furcation housing according to an embodiment of the disclosure.

With the furcation housing 64 being generally described with reference to FIGS. 5, 7, and 7A in conjunction with the rack cable harness 60, an exemplary embodiment of the furcation housing 64 is now described without the multifiber cable 62 or breakout legs 66 from the rack cable harness 60. With reference now to FIG. 7B, the body 90 of the furcation housing 64 defines an opening 104 at the cable end 92 and an opening 110 at the breakout end 94. The body 90 has a generally tubular configuration with a circular cross section centered on a longitudinal axis 112. The openings 104 and 110 are therefore circular and generally centered on the longitudinal axis 112. A wall 120 of the body 90 defines an inner surface 114 and an outer surface 116. While the wall 120 is shown as being generally uniformly thick from the cable end 92 to the breakout end 94 and so has a ring-shaped cross-section at any location along the longitudinal axis 112, embodiments of the invention are not limited to the uniformly thick wall configuration shown. Specifically, this disclosure contemplates a variable thickness wall in which the inner surface 114 does not necessarily have the same configuration as the outer surface 116. Specifically, the configuration of the outer surface 116 may take a different, unrelated form (and may serve a different function) as compared to the configuration of inner surface 114. As an example, the body 90 may have an outer surface in a shape of a rectangular prism while the inner surface 114 has the circular cross-sectional configuration shown in FIG. 7B.

In the exemplary embodiment, and with reference to FIG. 7B, the inner surface 114 of the furcation housing 64 may be visually divided into portions with one or more of the portions of the inner surface 114 providing a specific function during the manufacturing of the rack cable harness 60, described below. In that regard, the body 90 includes a primary fanout tube portion 122 extending from the cable end 92 toward the breakout end 94. The inner surface 114 of the primary fanout tube portion 122 is formed to receive the primary fanout tube 74 and the inner buffer layer 78, if present, of the multifiber cable 62. The primary fanout tube 74 is shown received in the primary fanout tube portion 122 in FIG. 7A.

The inner surface 114 defines a stop 130 in the primary fanout tube portion 122 near end 92. During manufacturing of the rack cable harness 60, the primary fanout tube 74 is inserted through opening 104 to abut the stop 130. The stop 130 thereby prevents over insertion of the primary fanout tube 74 toward the breakout end 94. In view of the stop 130, the technician may be assured that the primary fanout tube 74 is properly inserted within the furcation housing 64. The exemplary stop 130 is a result of an offset in the internal cross-sectional area along the length of the primary fanout tube portion 122. As shown, from opening 104 and toward the opening 110, the cross-sectional area enclosed by inner surface 114 decreases abruptly to form the stop 130. That is, at the stop 130, the inside diameter of the body 90 changes resulting in an exposed ledge in the wall 120 facing in the direction of the opening 104. In one embodiment, a dimension of the stop 130 perpendicular to the longitudinal axis 112 may be substantially equal to a thickness of the outer protective sheath layer 76. In one embodiment, a stop or step may also be provided for the inner buffer layer 78.

In FIG. 7B, from the breakout end 94 toward the cable end 92, the body 90 includes a secondary fanout tube portion 124. In the secondary fanout tube portion 124, the inner surface 114 is formed to receive each of the plurality of secondary fanout tubes 100 of the breakout legs 66. This is shown by way of example in FIG. 7A. The secondary fanout tube portion 124 may include an oversized slip 132 at the opening 104 and extending longitudinally a predetermined distance toward the cable end 92 of the furcation housing 64. The inner surface 114 of the oversized slip 132 defines a cross-sectional area larger than the cross-sectional area defined by the remainder of the inner surface 114 of the secondary fanout tube portion 124 and larger than the outer diameter of a collection of breakout legs 66. Unlike the stop 130 of the primary fanout tube portion 122, an offset created by the oversized slip 132 is not intended to operate as a stop to the insertion of the plurality of secondary fanout tubes 100 of the breakout legs 66. Instead, the additional radial volume provided by the oversized slip 132 may receive heat shrink wrap or other binding material, such as tape, (shown in FIG. 7A) which may be used to bind an assembly of the secondary fanout tubes 100 prior to their insertion into the furcation housing 64 during manufacturing of the rack cable harnesses 60, described below. The heat shrink wrap may ensure a snug fit of the assembly of the secondary fanout tubes 100 in the secondary fanout tube portion 124. In alternative embodiments, the secondary fanout tubes 100 may instead be supported by an insert/faceplate (not shown) that is received in the oversized slip 132.

With continued reference to FIG. 7B, the body 90 includes a transition portion 126 that extends between the primary fanout tube portion 122 and the secondary fanout tube portion 124. The inner surface 114 of the transition portion 126 facilitates insertion of the subunits 68 or alternatively the optical fibers 70 from the secondary fanout tube portion 124 toward the primary fanout tube portion 122. In that regard, and as is described in more detail below, the inner surface 114 of the transition portion 126 is designed to guide an end of each subunit 68 or an end of each optical fiber 70 toward the longitudinal axis 112 during manufacturing of the rack cable harness 60, specifically during insertion of the optical fibers 70.

Further in that regard, with reference to the transition portion 126, the inner surface 114 of the secondary fanout tube portion 124 defines a larger cross-sectional area than the inner surface 114 of the primary fanout tube portion 122. Along the length of the transition portion 126, the cross-sectional area defined by the inner surface 114 reduces from the cross-sectional area of the secondary fanout tube portion 124 to a cross-sectional area that is less than or the same as the cross-sectional area of the primary fanout tube portion 122. As a result, and as an exemplary configuration, the inner surface 114 in the transition portion 126 may have a funnel shape in which the inner surface 114 is linear in a direction parallel to the longitudinal axis 112 and gradually defines a decreasing cross-sectional area from the secondary fanout tube portion 124 toward the primary fanout tube portion 122. The cross-sectional area may thus taper from the cross-sectional area of secondary fanout tube portion 124 toward the cross-sectional area of the primary fanout tube portion 122. Stated another way, the inner surface 114 defines a smallest cross-sectional area at an intersection 136 between the primary fanout tube portion 122 and the transition portion 126 and defines a largest cross-sectional area at an intersection 140 of the transition portion 126 and the secondary fanout tube portion 124. The inner surface 114 in the transition portion 126 transitions from the largest to the smallest cross-sectional area. By way of example only and not limitation, a cross-sectional area at the intersection 140 is at least 50% larger than the cross-sectional area of at the intersection 136. By way of further example, a cross-sectional area of the intersection 140 is from 50% to 100% larger than the cross-sectional area of the intersection 136. The relative ratio in the cross-sectional area defined by the inner surface between the two intersections 136 and 140 may depend on the outer dimensions (e.g., diameter) associated with each of the primary fanout tube 74 and the number of and the outer dimensions (e.g., diameter) of the secondary fanout tubes 100.

So, while the inner surface 114 in each of the primary fanout tube portion 122 and the secondary fanout tube portion 124 is generally parallel to the longitudinal axis 112, the inner surface 114 within the transition portion 126 has a non-parallel orientation with respect to the longitudinal axis 112. In the exemplary embodiment, in a cross section of the furcation housing 64, such as that shown in FIG. 7B, a linear extrapolation (shown by phantom line in FIG. 7B) of the inner surface 114 may intersect the longitudinal axis 112 at an angle X of from 5° to 45°.

In addition, in one embodiment shown in FIG. 7B, the transition portion 126 further includes a lead-in transition 142 or bevel. As shown, the lead-in transition 142 may extend from the intersection 140 toward the intersection 136 from 10% to 25% of the overall longitudinal length of the transition portion 126. The lead-in transition 142 forms an angle Y with the longitudinal axis 112 that is greater than the angle X. By way of example only, angle Y may be 5° to 20° greater than angle X. The lead-in transition 142 may provide a more abrupt rate of change in the inner surface 114 starting from the intersection 140 toward the intersection 136. In alternative embodiments, however, the inner surface 114 in the transition portion 126 may not include any lead-in transition and may instead extend from the intersection 140 toward the intersection 136 at a substantially constant angle X. In either embodiment, during manufacturing of the rack cable harness 60, the intersection 140 may function as a stop to the insertion of the secondary fanout tubes 100 beyond the secondary fanout tube portion 124.

With reference now to FIGS. 5 and 9, 10, 11, 12, and 13, an exemplary embodiment of manufacturing a rack cable harness 60, shown for example in FIG. 5, is described. In one embodiment, and with reference to FIG. 9, a furcation subassembly 150 is first assembled. In that regard, and with reference to FIGS. 9 and 10, the primary fanout tube 74 is inserted (as indicated by arrow 152 in FIG. 10) through the opening 104 at the cable end 92 into the furcation housing 64. The primary fanout tube 74 may fit snuggly in the primary fanout tube portion 122, that is, the outer dimension of the primary fanout tube 74 may be approximately the same size as inside diameter of the primary fanout tube portion 122. During insertion, a technician may insert the primary fanout tube 74 into the furcation housing 64 until the primary fanout tube 74 abuts the stop 130. As shown in the exemplary embodiment, the outer protective sheath layer 76 is positioned to abut the stop 130 while the inner buffer layer 78, if present, may extend beyond the end of outer protective sheath layer 76. When the inner buffer layer 78 is present, the technician may initially strip off the outer protective sheath layer 76 of the primary fanout tube 74 to expose an end length of the inner buffer layer 78. As such, the inner buffer layer 78 may extend beyond an end of the outer protective sheath layer 76 (which abuts the stop 130), as shown, and an end of the inner buffer layer 78 may be positioned at or near the intersection 136, which may define another stop or step.

Either before or after the primary fanout tube 74 is assembled with the furcation housing 64, the plurality of secondary fanout tubes 100 may be assembled with the furcation housing 64. The plurality of secondary fanout tubes 100 may be inserted through the opening 110 at the breakout end 94 up to the intersection 140, at which point the plurality of secondary fanout tubes 100 may be stopped from further insertion by the transition portion 126. In the exemplary embodiment, the secondary fanout tubes 100 may abut the lead-in transition 142 when properly inserted into the furcation housing 64.

In one embodiment, the secondary fanout tubes 100 are bundled together into an assembly 154 prior to insertion into the furcation housing 64. As an example, the plurality of secondary fanout tubes 100 may be bound together with heat shrink wrap 156 or similar material. As an example, heat shrink wrap may be wrapped around the secondary fanout tubes 100 at two locations, at the furcation end 96 and at a location spaced apart from the furcation end 96 around the outer diameter of the assembly 154. Heat may be applied to the heat shrink wrap 156 to bind the secondary fanout tubes 100 together.

Once the plurality of secondary fanout tubes 100 is bound together, the assembly 154 may be inserted into the furcation housing 64 as indicated by arrow 160 (FIG. 10) such that the heat shrink wrap 156 abuts the transition portion 126 at the intersection 140 and resides in the oversized slip portion 132 at the other location. Prior to binding the plurality of secondary fanout tubes 100, the technician may strip the outer jacket 106 from an end portion of each of the plurality of secondary fanout tubes 100 to expose the buffer layer 108. Heat shrink wrap 156 may bind the secondary fanout tubes 100 of the buffer layer 108. In this way, the bundled assembly 154 may fit snuggly in the secondary fanout tube portion 124 with heat shrink wrap 156 at the intersection 140. After insertion, the furcation end 82 of the primary fanout tube 74 is at a fixed, predetermined distance from the furcation end 96 of any single one of the plurality of secondary fanout tubes 100.

The primary fanout tube 74 and each of the secondary fanout tubes 100 may be cut to a predetermined length, for example, a length specified by the customer or other predetermined dimension. The secondary fanout tubes 100 may also be trimmed to a length specified by the customer or other predetermined dimension. However, each of the secondary fanout tubes 100 may have a different length such that no two secondary fanout tubes 100 are of the same length. As an alternative, any two or more of the secondary fanout tubes 100 may be grouped together with that particular group having a specified length. For example, for twelve secondary fanout tubes 100, there may be six pairs of secondary fanout tubes 100. Each of the fanout tubes 100 in the pair may be cut to the same length while that length is different from the remaining five pairs of secondary fan out tubes 100. This results in a staggered positioning of the secondary fiber optic connectors 102 along the length of the cable harness 60. Other groups for twelve secondary fanout tubes may include four groups of three fanout tubes, three groups of four fanout tubes, and two groups of six fanout tubes and any other combination. However, the groups do not need to have equal numbers of secondary fanout tubes 100. It will be appreciated that the number of secondary fanout tubes 100 may determine the number of groups and the individual number of secondary fanout tubes 100 in each group.

In one embodiment, after cutting one or both the primary fanout tube 74 and the plurality of secondary fanout tubes 100 to length and before a single optical fiber 70 is inserted into the furcation subassembly 150, a portion of the connectors 84, 102 may be assembled onto respective the cut-to-length tubes 74, 100.

After the furcation subassembly 150 is manufactured, and before any optical fibers are inserted into the subassembly 150, the furcation subassembly 150 may be placed into inventory. That is, a plurality of furcation subassemblies 150 may be manufactured prior to manufacturing a single rack cable harness 60. A furcation subassembly 150 may be taken out of inventory as orders for rack cable harnesses 60 are received. To manufacture the rack cable harness 60 from the furcation subassembly 150, a plurality of optical fibers 70, either as subunits 68 or just the optical fibers 70 themselves, may be inserted into the furcation subassembly 150.

Figure 9:
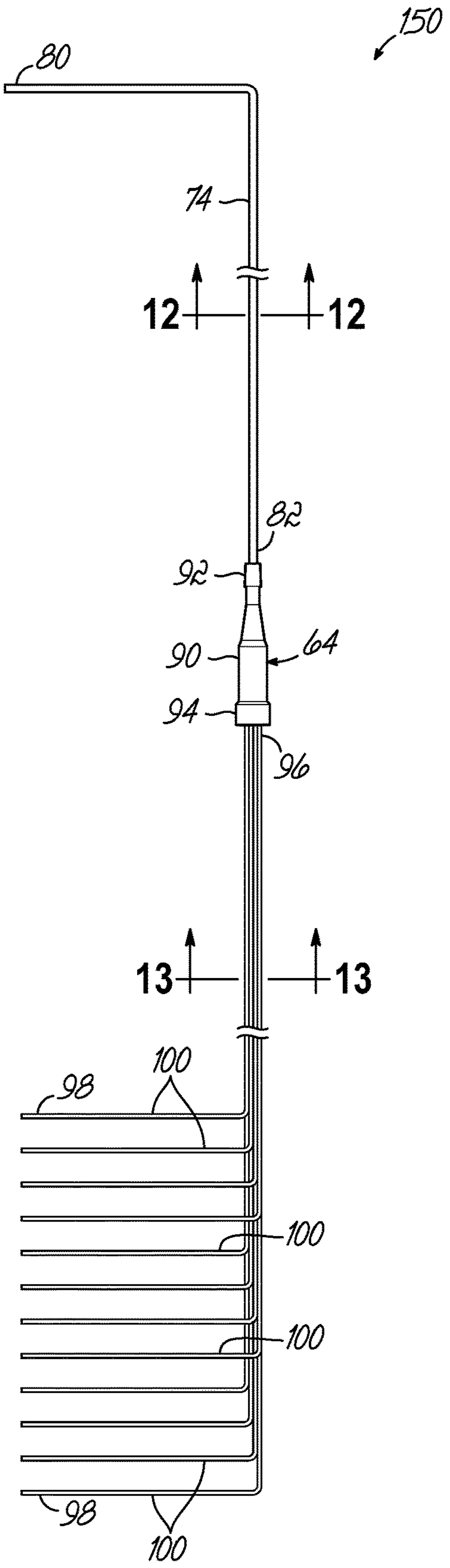
FIG. 9 is an exemplary furcation subassembly configured to receive optical fibers in manufacturing of a cable harness according to an embodiment of the disclosure.
Figure 10:
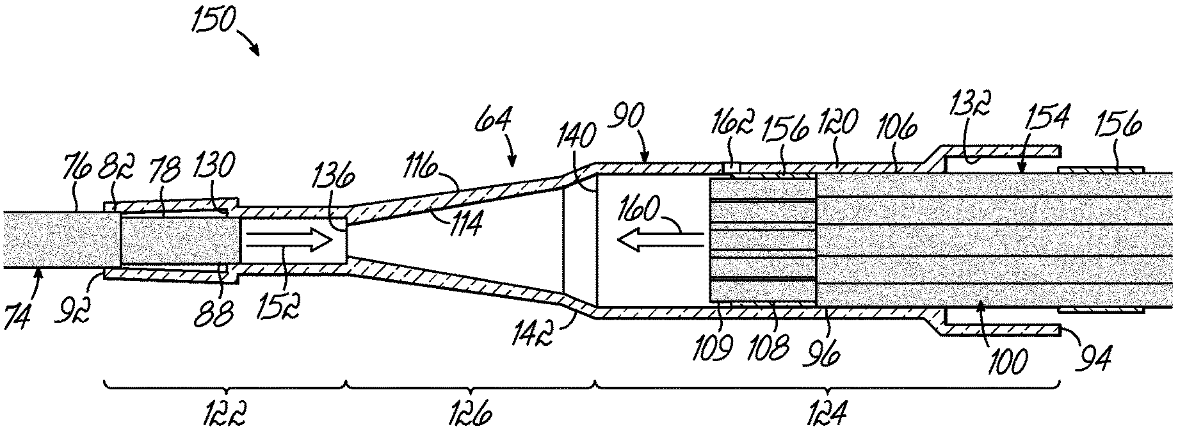
FIG. 10 is a cross-sectional view of a furcation housing during assembly of the furcation subassembly in accordance with an embodiment of the disclosure.
Figure 11:
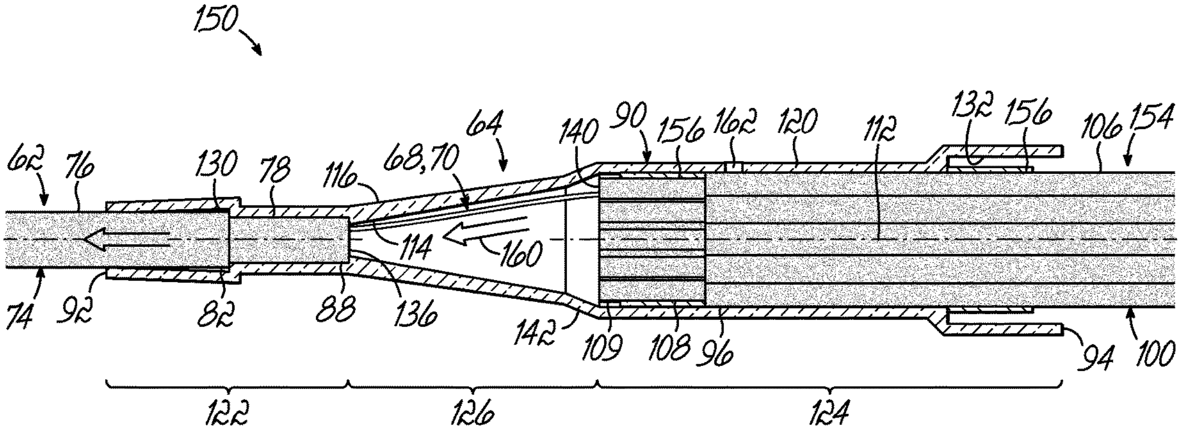
FIG. 11 is a cross-sectional view of the furcation housing of FIG. 10 during assembly of a cable harness in accordance with an embodiment of the disclosure.
Figure 12:
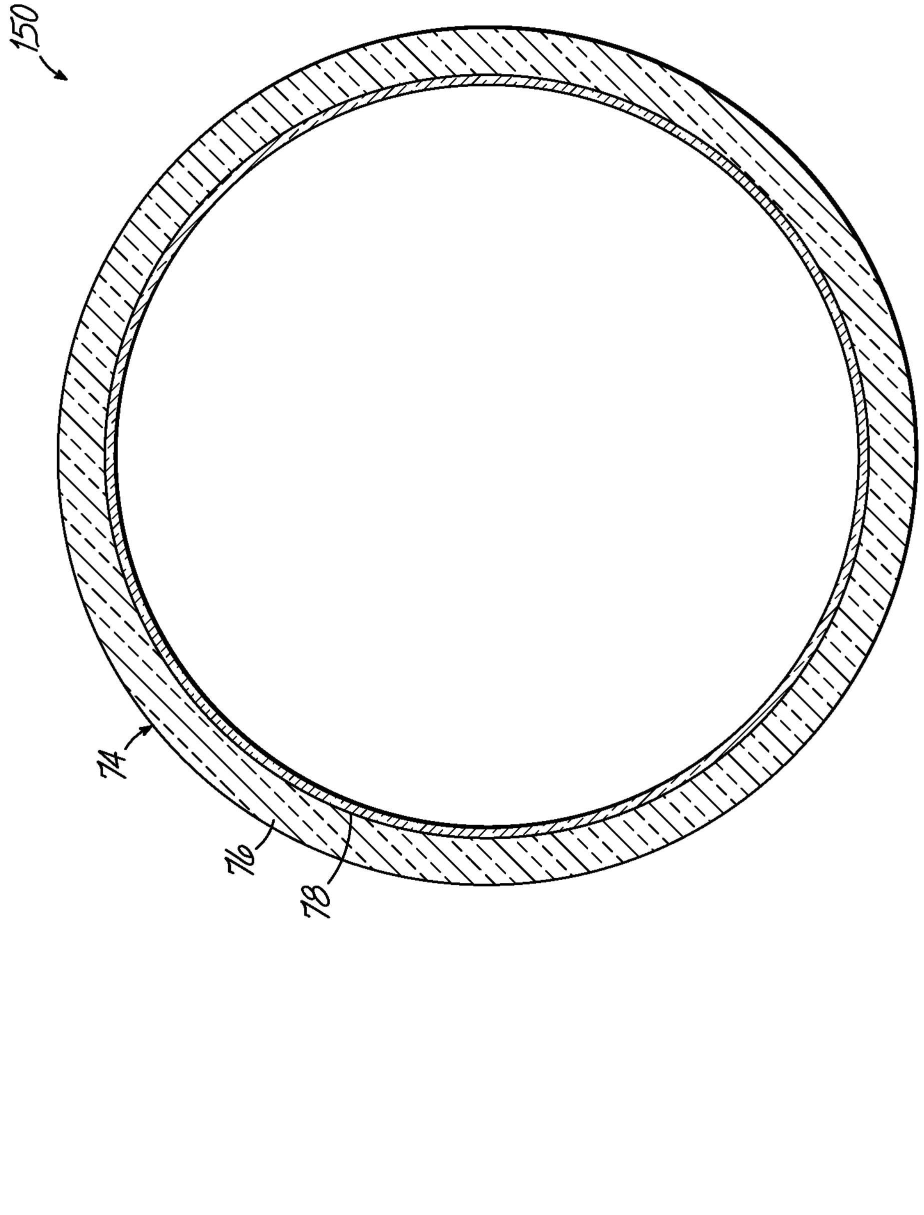
FIG. 12 is a cross-sectional view taken along section line 12-12 of FIG. 9.
Figure 13:
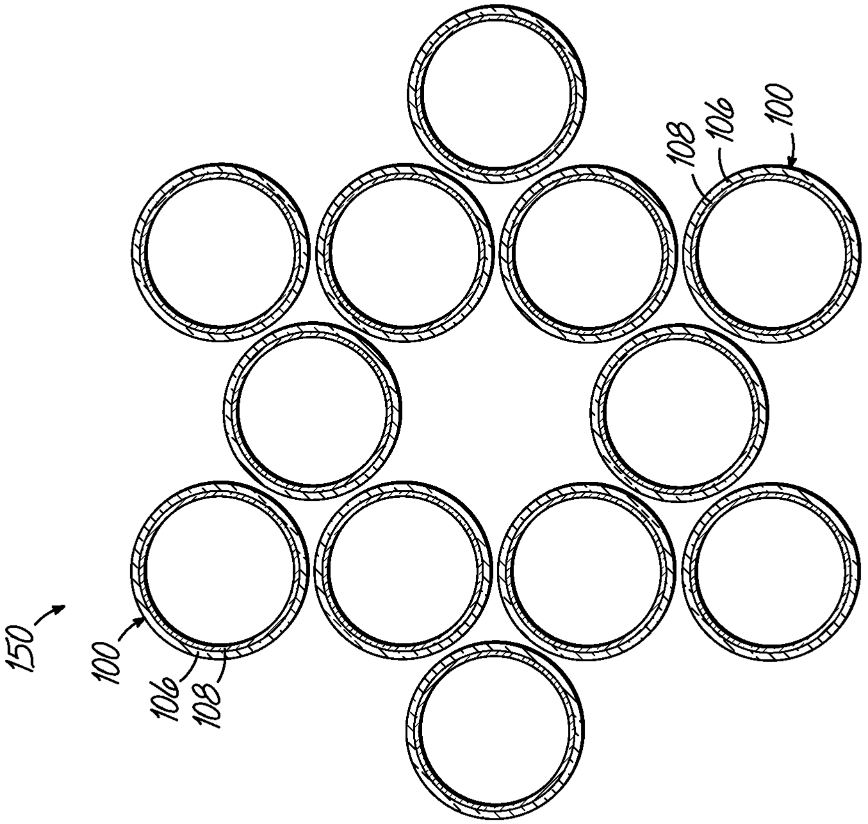
FIG. 13 is a cross-sectional view taken along section line 13-13 of FIG. 9.

To that end, in one embodiment and with reference to FIGS. 9 and 11, each optical fiber 70, as part of a subunit 68 or the optical fiber 70 alone, is inserted into a selected one of the secondary fanout tubes 100 at the rack end 98. The optical fiber 70 enters the furcation housing 64 and exits the furcation end 96 of the secondary fanout tube 100 at the transition portion 126. At this location in the furcation housing 64, the end of the optical fiber 70 may contact the inner surface 114 of the wall 120, as shown. Contact between the optical fiber 70 and the inner surface 114 in the transition portion 126 may depend on which of the secondary fanout tubes 100 the optical fiber 70 exits. As will be appreciated, secondary fanout tubes 100 on or adjacent the longitudinal axis 112 in the secondary fanout tube portion 124 may be generally longitudinally aligned with the primary fanout tube 74. Thus, optical fibers 70 exiting secondary fanout tubes 100 within a threshold radius of the longitudinal axis 112 may pass centrally through the transition portion 126 and into the primary fanout tube 74 without contacting the inner surface 114 of the transition portion 126.

In contrast, and with reference to FIG. 11, optical fibers 70 that exit secondary fanout tubes 100 outside the threshold radius from the longitudinal axis 112, such as exiting tubes 100 adjacent the inner surface 114, may not be in direct alignment with the primary fanout tube 74. At these locations, the optical fiber 70 may collide with the inner surface 114 in the transition portion 126, for example at the lead-in transition 142.

After contact with the inner surface 114 in the transition portion 126, as the optical fiber 70 is further inserted, the end of the optical fiber 70 slides along the inner surface 114 and is thereby directed toward the longitudinal axis 112 (as indicated by arrow 160 in FIG. 11). As shown, the primary fanout tube 74 is positioned concentrically on the longitudinal axis 112 at the narrowest portion of the transition portion 126. Thus, the optical fiber 70 slides along the inner surface 114 toward the longitudinal axis 112 and also toward the opening at the end of the primary fanout tube 74. By continued insertion, the optical fiber 70 enters the primary fanout tube 74 and eventually reaches the network end 80. And, once all optical fibers 70 are inserted, all connectors 84, 102 may be coupled to the respective tubes 74, 100 to complete the rack cable harness 60. By way of example only, and not limitation, inserting the optical fibers 70 may including jetting, blowing, and/or vacuuming the optical fibers 70. These techniques are well known in the fiber optic industry and thus will not be described in further detail herein.

In one embodiment, after insertion of the optical fibers 70, an epoxy or other similar adhesive material may be injected into the furcation housing 64 and around the optical fibers 70 in the transition portion 126. As an example, epoxy may be injected through one or more openings 162 in the wall 120 (one shown). The openings 162 may be oriented perpendicular to the longitudinal axis 112 between ends 92 and 94 and provide a fluid pathway into the secondary fanout tube portion 124, which in turn may provide a fluid pathway into the transition portion 126 through space not occupied by the secondary fanout tubes 100. The epoxy may encase and fix portions of the secondary fanout tubes 100 and the subunits 68/optical fibers 70 in the transition portion 126 and extend fully or partly into each of the primary fanout tube portion 122 and the secondary fanout tube portion 124. It is believed that the epoxy may carry and transfer any tensile loads between the ends 92, 94 of the furcation housing 64 and so reduce stress on the subunits 68/optical fibers 70.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Thus, it should be evident that departures may be made from such details without departing from the scope of the disclosure.

What is claimed is:

1. A furcation subassembly for carrying a plurality of optical fibers, the furcation subassembly comprising:

(A) a primary fanout tube for carrying a plurality of optical fibers and having a first end and a second end, the first end being configured to receive a primary fiber optic connector;

(B) a plurality of secondary fanout tubes, each secondary fanout tube of the plurality of secondary fanout tubes having a first end and a second end, (i) wherein each secondary fanout tube of the plurality of secondary fanout tubes is configured to carry at least one optical fiber of the plurality of optical fibers, and (ii) wherein the first end of each of the plurality of secondary fanout tubes is configured to receive at least one secondary fiber optic connector; and (C) a furcation housing including a body having:

(i) a cable end opposing a breakout end, wherein the cable end receives the second end of the primary fanout tube, and the breakout end receives the second end of each secondary fanout tube of the plurality of secondary fanout tubes, and (ii) a first stop at a first distance from the cable end and a second stop at a second distance from the breakout end, wherein the first stop is spaced apart from the second stop by a predetermined distance that defines a fixed distance between the second end of the primary fanout tube and each second end of each secondary fanout tube of the plurality of secondary fanout tubes;

wherein the plurality of secondary fanout tubes are bound together adjacent the second ends to form a bundled assembly;

wherein the bundled assembly is received in the breakout end of the furcation housing such that one or more of the secondary fanout tubes abuts the second stop; and wherein neither the primary fanout tube nor the plurality of secondary fanout tubes houses an optical fiber.

2. The furcation subassembly of claim 1, wherein the body has a transition portion between the first stop and the second stop, the transition portion decreasing in cross-sectional area from the second stop toward the first stop.

3. The furcation subassembly of claim 2, wherein the transition portion has a funnel configuration.

4. The furcation subassembly of claim 2, wherein when the plurality of optical fibers is inserted through the furcation housing, the transition portion is configured to guide at least some of the plurality of optical fibers from their respective secondary fanout tubes into the primary fanout tube.

5. The furcation subassembly of claim 1, wherein the body defines a first opening at the cable end and a second opening at the breakout end, and wherein the first opening receives the primary fanout tube and the second opening receives the plurality of secondary fanout tubes, the second opening having a cross-sectional area greater than a cross-sectional area of the first opening.

6. The furcation subassembly of claim 1, wherein each of the secondary fanout tubes of the plurality of secondary fanout tubes is equal in length from a respective first end to a respective second end.

7. The furcation subassembly of claim 1, wherein a first length from a respective first end to a respective second end of each secondary fanout tube of a first group of at least two secondary fanout tubes of the plurality of the secondary fanout tubes is equal and a second length from a respective first end to a respective second end of each secondary fanout tube of a second group of at least two secondary fanout tubes of the plurality of secondary fanout tubes is equal, wherein the first length is not equal to the second length.

8. A method of manufacturing a rack cable harness for carrying a plurality of optical fibers, the cable harness including:

(i) a primary fanout tube for carrying a plurality of optical fibers;

(ii) a plurality of secondary fanout tubes, each of the secondary fanout tubes of the plurality of secondary fanout tubes for carrying at least one optical fiber of the plurality of optical fibers; and (iii) a furcation housing including a body having a cable end opposing a breakout end, a first stop at a first distance from the cable end and a second stop at a second distance from the breakout end, wherein the first stop is spaced apart from the second stop by a predetermined distance, the method comprising:

stripping an end portion of the primary fanout tube to expose an inner layer of the primary fanout tube, the stripped end forming a first end of the primary fanout tube;

inserting the first end of the primary fanout tube into the cable end of the furcation housing, the primary fanout tube abutting the first stop;

stripping an end portion of each of the secondary fanout tubes of the plurality of secondary fanout tubes to expose an inner layer of each secondary fanout tube of the plurality of secondary fanout tubes, the stripped end forming a first end for each of the secondary fanout tubes of the plurality of secondary fanout tubes;

bundling each of the secondary fanout tubes of the plurality of secondary fanout tubes to form an assembly of the plurality of secondary fanout tubes; and inserting the assembly of the plurality of secondary fanout tubes into the breakout end of the furcation housing, one or more of the secondary fanout tubes abutting the second stop, wherein the first end of the primary fanout tube is a fixed distance from each first end of each of the secondary fanout tubes in the assembly of the plurality of secondary fanout tubes, the fixed distance being determined by the predetermined distance between the first stop and the second stop.

9. The method of manufacturing of claim 8, wherein, following inserting the first end of the primary fanout tube, the method further comprises:

cutting the primary fanout tube to form a second end of the primary fanout tube, the first end to the second end of the primary fanout tube being of a first predetermined length and the second end of the primary fanout tube being configured to receive a primary fiber optic connector.

10. The method of manufacturing of claim 8, wherein, following inserting the assembly of the plurality of secondary fanout tubes into the breakout end of the furcation housing, the method further comprises:

cutting at least one of the secondary fanout tubes of the plurality of secondary fanout tubes to form a second end of the at least one of the secondary fanout tubes, the first end to the second end of the at least one of the secondary fanout tubes being of a second predetermined length and the second end of the at least one of the secondary fanout tubes being configured to receive a secondary fiber optic connector.

11. The method of manufacturing of claim 10, wherein cutting the at least one of the secondary fanout tubes includes cutting each of the secondary fanout tubes of the plurality of fanout tubes to the second predetermined length.

12. The method of manufacturing of claim 10, wherein cutting the at least one of the secondary fanout tubes includes cutting each tube of a first group of at least two secondary fanout tubes of the plurality of fanout tubes to a first length and cutting each tube of a second group of at least two secondary fanout tubes of the plurality of fanout tubes to a second length, wherein the first length is different from the second length.

13. The method of manufacturing of claim 8, further comprising:

inserting at least one optical fiber through one of the secondary fanout tubes of the plurality of fanout tubes, through the body, and into the primary fanout tube.

14. The method of manufacturing of claim 8, wherein bundling each of the secondary fanout tubes of the plurality of secondary fanout tubes further comprises:

wrapping heat shrink around an outer diameter of the assembly at the furcation end, and heating the heat shrink to bind each of the secondary fanout tubes of the plurality secondary fanout tubes in the assembly.

15. The method of manufacturing of claim 8, wherein bundling each of the secondary fanout tubes of the plurality of secondary fanout tubes further comprises:

wrapping heat shrink around an outer diameter of the assembly at a location spaced apart from the first end of each of the secondary fanout tubes of the plurality of fanout tubes, and heating the heat shrink to bind each of the secondary fanout tubes of the plurality secondary fanout tubes in the assembly.

* * * * *